3,085,914
NOVEL CRYSTALLINE SUGAR PRODUCTS
Daniel V. Wadsworth, Plandome, Norman Rosenberg, Dobbs Ferry, and Santino Paul Marino, Tarrytown, N.Y., assignors to Corn Products Company, New York, N.Y., a corporation of Delaware
No Drawing. Filed June 30, 1959, Ser. No. 823,849
10 Claims. (Cl. 127—30)

This application is a continuation-in-part of our co-pending application, Serial No. 736,986, filed May 22, 1958, now abandoned.

This invention relates to novel crystalline sugar products and to a novel continuous process for producing them. More particularly, the invention relates to crystalline products of sucrose which optionally, but desirably, contain minor amounts of mono-, and other di-saccharides and/or starch and/or other polysaccharides, such as dextrins, etc.

Except for liquid forms of sugar (aqueous sugar solutions), substantially all of the dry sugar produced commercially today is produced originally in the form of hard grain, smooth-surfaced, crystalline sugar. Insofar as dry sugar products are concerned, the sugar industry provides about the same line of products that it marketed 40 years ago. Even powdered sugar is produced from the hard grain crystalline or granulated sugar by subjecting it to costly milling operations. The processes used to produce granulated sugar require a time interval of between 20 to 60 hours at high temperatures before all of the sugar is removed from the virgin pan liquors. These long drawn out processes employed in producing granulated sugar often result in considerable color development and they require a large capital investment in equipment. There are a great number of steps required in the present commercial processes which require boiling and reboiling, centrifuging and recentrifuging, slow crystallizations, and finally drying and screening. In the present commercial production of powdered sugar, the granulated sugar must be milled, adding substantially to the cost of the powdered product. In addition to the costliness of the product, hard grain sugar, whether granulated or powdered, has a serious tendency to cake and harden when stored under certain atmospheric conditions.

It is an object of the present invention to provide a superior dry crystalline form of sugar which provides substantial and significant advantages over the prior art hard grain sugar.

It is another object of the present invention to provide novel dry crystalline sugar products which optionally, but desirably, contain within the same crystals at least one mono- or other di-saccharide, starch or poly-saccharide.

It is also an object of the present invention to provide novel dry crystalline sugar products, which provide excellent fondant icings upon the addition of water, containing within the same crystals a major proportion of sucrose and a minor proportion of starch, and optionally, but preferably, a minor proportion of a mono- or other di-saccharide.

It is a further object of the present invention to provide an inexpensive and efficient continuous, automatic process for producing crystalline sugar products which imparts substantial advantages over prior art processes and produces rapidly large quantities of product.

It is an additional object of the present invention to provide an inexpensive and efficient process for producing the novel dry crystalline sugar products, containing within the same crystals a major proportion of sucrose and a minor proportion of starch, and optionally a minor proportion of a mono- or other di-saccharide of polysaccharide, such as dextrin.

Additional objects will be apparent to those skilled in the art from reading this description.

Our novel continuous process for producing dry crystalline sugar products employs only a few steps and efficiently produces a dry crystalline product having properties superior to those of crystalline sugar products now commercially available. The process is continuous and rapid, permitting transformation of an aqueous sugar solution to a substantially dry crystalline product containing less than 1% moisture in a matter of minutes. The process provides substantially 100% recovery of sugar solids without requiring reprocessing of any of the liquors or solids produced. In addition to these efficiencies and advantages of the process, the products thereby produced are remarkably superior in their properties.

Essentially, the process of the present invention comprises continuously and rapidly evaporating an aqueous sugar solution, which may desirably contain at least one other sugar and/or starch and which has a Brix value of above 50°, although desirably less than about 75° and preferably between about 67° and 70°, whereby through continuous and rapid evaporation of water the Brix value is increased continuously and rapidly up to at least about 90° and desirably to between about 92° and 97°. The evaporation is continued rapidly to produce a supersaturated solution of the sugar on cooling. For successful results and uniformity of product, it is desirable to maintain the temperature at which the rapid evaporation takes place relatively constant, varying not more than about ±2° F. This evaporation is desirably carried out at a temperature of between about 260° and 300° F. (preferably 265 to 290° F.), with the temperature selected varying in relation to the nature of the sugar composition of the initial sugar solution employed. The concentrated saturated sugar solution is then passed immediately from the rapid evaporator into a jacketed temperature-controlled mixer-crystallizer where the concentrated saturated solution is subjected to mixing and the temperature permitted to decrease until it has been reduced to a range of between about 180° and 230° F. During this mixing and cooling, and within a short period of time, the viscous, concentrated supersaturated sugar solution which results spontaneously crystallizes, and due to the latent heat given up during crystallization, substantially all of the residual water is evaporated and escapes from the mixer. With the removal of the last amounts of water, the crystals of sugar product are discharged from the mixer-crystallizer in the form of hot crystals. These crystals are immediately subjected to additional mixing during which time the temperature of the crystals is reduced to less than about 100° F. This latter step, namely, mixing the crystals while cooling, until their temperature is reduced to below about 100° F., forms an important step in our process since it prevents lump formation. The resulting product, which is substantially dry (containing less than about 1% moisture), is then ready for use except for optional screening and/or powdering and packaging.

The process of the invention is suitable for converting aqueous solutions of various concentrations of sucrose. The sugar content of these solutions may be substantially entirely sucrose or desirably the solution may contain additional carbohydrates such as dextrose, invert sugar, lactose, or corn syrup solids, or mixtures thereof. Desirably, the additional carbohydrates shall constitute less than about 25% and preferably less than 15%, by weight of the sugar solids in the solution. In accordance with one important embodiment of the present invention, a starch is, optionally, but desirably, added to the sugar solution, in which the sugar may be present solely in the form of sucrose or as mixtures of sucrose and mono- or other di-saccharides. When starch is employed, it is desirably employed in an amount of between about 1% and 10% by weight of sucrose.

One of the additional saccharides which may be advantageously present is invert sugar. This material, which is desirably present in an amount of less than 25% and preferably between about 2 and 12%, of the total sugar solid content, provides products which possess significant advantages. One of the advantages of such a product is that the final dry crystalline product contains the invert intimately and uniformly co-crystallized in each crystal along with sucrose. This phenomenon is quite different from the state which exists when crystalline invert-containing sucrose products of the prior art are produced. In the prior art products, the invert is not contained in any substantial amount within the crystals containing the sucrose. The invert exists as a film on the surface of the sucrose crystals. The invert-containing crystalline products of the preesnt invention are superior to the invert-containing crystalline products of the prior art in that they are substantially non-hygroscopic and non-caking and dissolve more rapidly in water.

Other advantages of the applicants' products and processes will be discussed in greater detail hereinbelow.

While the applicants' process is not limited to the use of specific forms of evaporators and mixers, certain forms of such apparatus, which are readily available commercially, have been found to provide eminently satisfactory results. The evaporator employed in the first step of the process to continuously produce the condensed saturated viscous sugar solution is desirably one of the high-efficiency, rapid evaporators currently available, providing such apparatus permits close control of temperature. One efficient centrifugal evaporating equipment is the turba-film evaporator marketed by the Rodney Hunt Machine Company. This evaporator consists essentially of a jacketed vertical cylinder having vertically mounted high-speed rotor blades having relatively close tolerances with the inner vertical walls of the cylinder. These rotor blades rotate at high peripheral speed thereby forcing the liquid to be dried against the inner surface of the cylinder by centrifugal force. As the rotor blades rotate around the inner vertical surface, they force the liquid to be evaporated against the inner cylinder surface by centrifugal force and simultaneously form vertical descending fillets of liquid on the leading edge of each rotor blade. These fillets rotate with the blade movement imparting compressive rotational and centrifugal forces against the film of liquid on the inner surface, causing turbulence. The rotation of the blades provides a thin layer of liquid on the inner surface of the cylinder thereby providing greater surface area and more rapid evaporation. The jacket around the inner surface of the cylinder is heated by means of steam in controlled amounts. The liquid sugar descends as a component of the fillets traveling the entire length of the evaporator in a very short and precisely controlled period of time. The continuously heated, concentrated saturated sugar solution, which has had its Brix value increased to about 90°–97° in a very short period of time due to the high degree of efficiency of this apparatus, then continuously passes from the apparatus into the next stage of the process. The Rodney Hunt apparatus referred to hereinabove and employed in the specific examples hereinbelow is described in U.S. Patent No. 2,598,086 of Hans K. Muller which issued May 6, 1952. It is intended to incorporate by reference the disclosure and drawings of this patent in its entirety.

We have found that continuous temperature control of the concentrated saturated liquid leaving the evaporator is important. Not only is it important to determine a suitable temperature for the particular sugar composition being processed and dried, but it is important to maintain that temperature within limits of ±2° F. The temperature range for each sugar composition will vary somewhat. Thus, while a temperature range of 267° F.±2° F. is suitable for a solution in which substantially the only sugar is sucrose, when the sugar solids consist of 8% invert in addition to sucrose, a temperature of 287°±2° F. is suitable. When the sugar composition consists of sucrose with varying amounts of invert, we have found that the preferred or mean temperature may be calculated by the following formula:

$$T_x = 267° \text{ F.} + 2.5a$$

where $T_x$ = the mean temperature required
$a$ = percent invert of total sugar solids When carbohydrates, such as dextrose, lactose, and corn syrup solids are also present with the sucrose, other temperatures in accordance with the specific examples hereinbelow are suitable. When starch is also present with the sucrose or sucrose and carbohydrates, the temperature employed is the same as that employed for the sucrose or mixtures thereof with the carbohydrates.

The mixer-crystallizer into which the concentrated saturated sugar solution continuously enters after treatment in the evaporator, may be any mixing device which provides beating of the concentrated sugar solution with adequate temperature control. One such mixer-crystallizer comprises substantially a cylinder having therein a rotating shaft parallel with the longitudinal axis of the cylinder, to which blades are attached to provide trituration and agitation of the sugar as well as to advance the travel of the sugar through the apparatus. The shaft holding the agitating blades may be rotated at any speed, but desirably at about 30–40 r.p.m., depending upon the particular equipment employed, during the mixing and crystallization of the sugar. The concentrated supersaturated sugar solution increases in viscosity and, because of its state of super-saturation and the slight decrease in temperature from that of the evaporator, spontaneous crystallization occurs. During the very short period of time during which the viscous sugar solution is converted into the crystalline state, there is intimate mixing and trituration. Substantially all of the residual water vaporizes, leaving behind the finely-divided crystalline sugar product. Due to the almost instantaneous loss of water, there is no significant subsequent crystal growth and the crystals produced are substantially in the same form in which they are initially formed. The resulting product, as it is discharged from the crystallizer, consists of finely-divided, random, uneven crystals.

After the hot crystals leave the crystallizer, it is important that they be constantly agitated until the temperature of the crystals is reduced to below about 100° F. It is desirable to pass the hot crystals into a mixer surrounded with a cooling jacket. The cooling jacket is provided with a flow of cooling water which assists in cooling the sugar. Desirably, cooled (preferably 33–40° F.) compressed air (such as 60 p.s.i.) is passed over the crystals while they are being mixed. The rapid cooling lowers the temperature of the crystalline sugar product to below about 100° F. and prevents formation of lumps. The thus cooled sugar crystals may then be subjected to screening, such as on a rotary vibrating screen, to remove crystals of undesired size. The dry product, which may or may not be powdered, now has less than about 1% moisture (preferably less than 0.6%) and is then ready for packaging.

As has been stated hereinabove, the dry crystalline sugar products obtained are unique in character. The product comprises fragile, fine grain aggregates or clusters of rough, jagged, porous crystals. The crystals are more easily crushed than granulated sugar and can be reduced to an even more finely-divided state, if desired. However, because of the extreme fineness and porosity of the grain, the products usually do not require grinding. The product is characterized by the rapid rate at which it dissolves in water. The products are further characterized by having greater bulk than even extra-fine granulated sucrose. Thus, while extra fine granulated sucrose has a density of 53 pounds per cubic foot, the densest product in accordance with the present invention has a density of 46 pounds per cubic foot at most. When compared to ordinary granulated sugar, some of the products in accordance with the present invention, have about one-half the density (twice the bulkiness). The products of the invention are further characterized by their freedom from undesirable coloration which often characterizes granulated sugar.

When the products of the invention are mixed with other dry solid materials or other crystalline materials, such as are incorporated into dry dessert products, such as gelatine desserts, ice cream mixes, puddings, cake mixes, etc., they provide the advantage of not settling out or stratifying. The prior art crystalline sugar products have a tendency to do this.

Where more than one sugar is present, and/or starch is present, the crystals of the present invention are characterized by substantially uniform distribution of each sugar and/or the starch throughout each crystal. This is another feature of the present invention which distinguishes it from the prior art products and processes. Another important feature of the products of the present invention is that they are substantially non-hygroscopic. This is particularly unique for products containing invert. As those skilled in the art recognize, invert sugar is notorious for its propensity to absorb moisture from the atmosphere. This difficulty has prevented the use of dry solid products containing invert. Accordingly, the present invention permits one to market invert-containing sugar products in dry solid form under circumstances which normally would be unfavorable.

The products of the present invention are eminently suitable for a number of purposes. One of the most important uses is in icings, such as cake icings. Icings produced employing the sugar products of the invention are substantially smoother than those produced from the most finely powdered granulated sugar, a premium price form of powdered sugar produced from granulated sugar crystals. The products of the invention are also eminently satisfactory in providing smooth chocolate coatings and chocolate products for the candy and baking industries. They are similarly very satisfactory for use in fondants. Other uses are in producing instant cocoa mixes, as well as cake mixes and gelatin dessert mixes, and other dry food mixes with which those in the food industry are familiar. The invert-containing products of the invention are particularly remarkable for their use in dry cake mixes because of their substantial lack of hygroscopicity or tendency to lump and after the cake is baked, it tends to remain fresh longer. So far as we are presently aware, this is the first time that an invert-containing sugar has been suitable for dry packaged cake mixes.

An important feature of the present invention comprises the introduction of a starch into the aqueous sugar solution employed as the starting material. The aqueous sugar starting solution may also contain, in addition to sucrose, the mono- and other di-saccharides enumerated hereinabove, including invert sugar, dextrose, lactose, corn syrup solids, etc. The aqueous sugar starting solution shall have a Brix value of above about 50° and when starch is present, it shall be present in an amount of between about 1% and 10% by weight of sucrose solids. When a mono- or other di-saccharide, or mixtures thereof are also present, the quantity of other saccharide shall be in an amount of up to about 10% by weight of total sugar solids.

As stated hereinabove, when the aqueous sugar starting solution, to which the starch has been added, is subjected to the continuous crystallization process of the invention, each crystal of sugar product contains distributed through each of the crystals sucrose, starch and any mono- or other di-saccharide present in the aqueous sugar starting solution. Each component is present in the final crystalline sugar product in the same proportions as present in the initial aqueous sugar solution (based upon total solids). This is believed to be a unique feature of the product of the invention and is a direct result of the continuous crystallization process of the present invention. This feature is believed to be unique and largely responsible for the beneficial properties of the starch-containing crystalline sugar products of the invention.

The starch is introduced directly into the aqueous sugar starting solution or in the form of a slurry or suspension in water. While the aqueous starch slurry may contain varying concentrations of starch, a 50% by weight aqueous suspension has been found to provide excellent results.

Various starches may be employed, such as tapioca, potato, wheat, oat, waxy, grain sorghum, corn starches, etc. The starches may be modified, e.g., acid-modified, enzyme-modified, oxidized, and the like. Starch fractions, as well as various starch derivatives, e.g., esters such as starch phosphates (mono-starch phosphate), starch acetate, and others such as carboxyalkyl starch (carboxymethyl starch), and the like, may be used also. The term "starch," as used herein, is intended to include any of the aforementioned substances.

The starch-containing crystalline sugar products of the invention are outstanding in being homogeneous and having free-flowing and non-caking characteristics when subjected to ordinary packaging and handling. Because of its homogeneous nature, it does not stratify or tend to settle out into separate components.

During the course of the continuous crystallization process, the starch component becomes gelatinized. Consequently, it is not necessary to employ pre-gelatinized starch in the process. During the process the starch becomes gelatinized as already mentioned so that in its final dried form, it will reconstitute with water to form a paste. When cake icings and fondants are made from this product, the starch takes up water; thereby producing a desirably higher viscosity in the icing. The resultant icings do not possess the undesirable starch taste, which is characteristic of the present day commercial sugars sold for making icings. In icings produced from the starch-containing crystalline sugar products of the invention, the liquid and solid phases do not separate on standing as is the case with icings produced from sugar previously commercially available. This unique property is believed to result from the fact that the starch component of the crystalline sugar product of the invention is both gelatinized and uniformly distributed with the sugar components in each crystal.

In the case of starch-containing crystalline sugar products of the invention intended for use in fondant creams or fondant cake icings, it is desirable that the crystals also contain up to about 10% by weight of a reducing sugar. This is provided by incorporating the desired amount of reducing sugar to the aqueous sugar starting solution. Corn syrup solids provide an excellent source of reducing sugars. They also contain other polysaccharides, such as the dextrins, which may be incorporated beneficially. The resulting crystalline product containing starch, corn syrup solids and sucrose has optimum free-flowing, non-caking and low hygroscopicity properties. This is believed to be surprising and unexpected since dry products containing corn syrup solids are generally hygroscopic, thereby having a tendency to cake.

In producing fondant creams or fondant cake icings, the crystalline starch-containing sugar product of the invention (containing from about 1% to 10% starch by weight of sucrose and desirably up to about 10% by weight of solids of a reducing sugar) is merely mixed with from about 10% to 15% by weight of water (preferably from about 12% to 14% of water). It is possible to employ more water with the products of the present invention than with the commercially available icing sugars because of the greater viscosity imparted to the icings or fondants by the gelatinized starch-containing crystalline sugar products of the present invention. This is an economical advantage since the same consistency or viscosity may be obtained using more water.

In order to more clearly disclose the nature of the present invention, the following examples are given for the purposes of illustration, employing the apparatus described hereinabove. It should be understood, however, that this is done solely by way of example and is intended neither to delineate the scope of the invention nor limit the ambit of the appended claims.

EXAMPLE 1

This example describes the preparation of a dry crystalline sugar product in accordance with the invention containing only insignificant amounts of ash, color, nonsugars, and sugars other than sucrose.

A water white liquid aqueous solution of sucrose of 67.4° Brix, containing a maximum of 0.02% ash, and in which the sugar solids content was as follows: 0.3% invert and 99.68% sucrose, was introduced continuously into a high speed centrifugal film evaporator of the turba-film type (Rodney Hunt), described hereinabove, in which the temperature control was set at 267° F. to maintain continuously the temperature of the sugar solution continuously leaving the evaporator at between 265 and 269° F. at all times. The continuous flow of the sugar solution through the centrifugal evaporator was maintained continuously at a rate of from 6 to 12 pounds of sugar solids per minute. At the time of discharging the solution from the centrifugal evaporator, most of the water had been removed from the sugar solution and it had a Brix of 92–94°. Continuous temperature control between 265–269° F. was of great importance since at a temperature below 265° F., the sugar obtained at the end of the process was quite wet, lumpy and hard grained, whereas at a temperature of above 269° F., the sugar was powdery, hard grained and lumpy. The concentrated sugar solution discharged from the centrifugal evaporator was next continuously passed into a mixer-crystallizer maintained at a temperature so that the crystalline sugar product which was discharged from it had a temperature of between about 180 and 190° F. and was dry, free from lumps and soft grained. The substantially dry crystalline sugar product was then passed continuously through a mixer having a cooling jacket through which was passed cold circulating water. Refrigerated air at a temperature of about 33–40° F., under a pressure of about 60 p.s.i., was passed over the crystals while they were being mixed. When the dry sugar product was discharged from the mixer, it had a temperature of less than 100° F. The resulting product yielded the following analytical data:

Percent sucrose _____ 98.8.
Percent invert _____ 0.6 max.
Percent moisture _____ 0.6 max.
Color (Horne scale) _____ 0.9 max.
Density _____ 46 pounds per cubic foot.

Photomicrographs show this sugar to be made up of irregular, sharp-edged crystals, which occur in clusters, singly and in groups. The crystals were smaller than granulated sugar crystals. The crystals were fragile and could easily be crushed with pressure. This sugar occupied a greater volume per unit weight than regular granulated sugar; it also had a higher rate of dissolving in water than granulated sugar. The sugar stored in paper bags remained unchanged; it was dry, free-flowing and did not cake or pack hard. It was easily converted into a powdered sugar by pulverizing, and as such remained soft and free flowing without the use of additives, such as starch.

This sugar is very valuable for use in dry mixes for instant use because of its high rate of solution; it also adds to stability of dry mixes because of its bulk (large volume per unit weight) by maintaining homogeneity of the mix and preventing stratification. This sugar, because of its fragility, is easily and finely crushed, making it valuable in the production of smooth chocolate. In the powdered form, this sugar makes a smoother icing than that obtained from powdered granulated sugar containing starch. Thus it is very valuable to the baking industry.

EXAMPLE 2

This example describes the preparation of a dry crystalline sugar product in accordance with the invention containing about 91% sucrose and 9% invert sugar.

An aqueous sugar solution, having a color of 0.3 on the Horne scale, of 68.8° Brix, in which the sugar solids content was about 8.09% invert and 91.91% sucrose, was introduced continuously into a high speed centrifugal film evaporator of the turba-film type (Rodney Hunt), described hereinabove, in which the temperature control was set at 287° F. to maintain continuously the temperature of the condensed sugar solution as it leaves the evaporator at between 285 and 289° F. at all times. The continuous flow of the sugar solution through the centrifugal evaporator was maintained at a rate of 6 pounds of sugar solids per minute. At the time of continuously discharging the sugar solution from the centrifugal evaporator, most of the water had been removed and it had a Brix of 95–97°. The temperature control of between 285–289° F. was of great importance since at a temperature of below 285° F., the sugar product obtained at the end of the process was quite wet, lumpy and hard grained, whereas at a temperature of above 289° F., the sugar product was hard grained, lumpy and off color. The concentrated sugar solution discharged continuously from the centrifugal evaporator was next passed into a mixer-crystallizer maintained at a temperature so that the solid sugar product which was discharged from it had a temperature of between about 215 and 230° F. and was dry, free from lumps and soft grained. The substantially dry sugar product was then passed continuously through a cooling mixer having a cooling jacket through which was passed cold circulating water. Refrigerated air, at a temperature of about 33–40° F., under a pressure of about 60 p.s.i., was passed over the crystals while they were being mixed. When the dry sugar product was discharged from the cooling mixer it had a temperature of less than 100° F. The resulting product yielded the following analytical data:

Percent sucrose _____ 90.75.
Percent invert _____ 8.65.
Percent moisture _____ 0.6 max.
Color (Horne scale) _____ 0.9 max.
Density _____ 36.5 pounds per cubic foot.

Photomicrographs show this sugar was made up of very small crystals, smaller than the crystals of Example 1, which are irregular, sharp-edged, and they occur mostly in clusters, but also singly and in groups. The crystals were fragile and easily crushed; they had a higher rate of solution and occupied a greater volume per unit weight than granulated sugar or the product of Example 1.

The sugar product of this example is excellent for icings, which are smoother than icings prepared from granulated powdered sugar or the product of Example 1. In a powdered form, this sugar product provides icings which are much better than those made from the same sugar without powdering. In the unpowdered form, the product has a much larger particle size than granulated powdered sugar used for icings, but it has been experimentally shown that, because the crystals are made up of more than one sugar, the individual sugars in the crystals go into solution in such proportions as to give a saturated solution of the mixture when the required amount of water for the preparation of the icing has been added. The water dissolves the invert sugar completely and such an amount of sucrose as is required for saturation of the liquid phase. The crystals disintegrate into very small crystals of sucrose which appear as the solid phase of the icing, thus resulting in a smoothness which is greater than that of icings prepared from powdered granulated sugars. In icings using the powdered product of this example, the disintegration of the crystal results in even smaller crystals in the solid phase thus resulting in a smoother icing.

Other products of the invention of sucrose-invert were also made containing 2%, 4% and 6% invert solids of the total sugar solids and the remainder sucrose. It is important to note that there is a critical temperature range of evaporation for each of these sugars below which the sugar is wet, lumpy and hard grained and above which the sugar is powdery, lumpy and hard grained. The sugars with these undesirable qualities have little or no value in use with other products.

The critical temperature range of the sugar solution discharging from the centrifugal evaporator necessary for producing quality products containing 0–8% invert, is directly related to the % invert present, and is shown in Table I below:

*Table 1*

| Sugars | Mean Temperature, °F. | Critical Temperature Range, °F. |
| --- | --- | --- |
| Sucrose 100%, Invert 0% | 267 | 265–269 |
| Sucrose 98%, Invert 2% | 272 | 270–274 |
| Sucrose 96%, Invert 4% | 277 | 275–279 |
| Sucrose 94%, Invert 6% | 282 | 280–284 |
| Sucrose 92%, Invert 8% | 287 | 285–289 |

For each increment increase of 2% invert solids of the total sugar solids, a corresponding increase of 5° F. in the mean temperature and critical temperature range is required.

EXAMPLE 3

This example describes the preparation of a dry crystalline sugar product in accordance with the invention containing about 90% sucrose and 9% dextrose.

An aqueous sugar solution, having a color of about 0.3 maximum on the Horne scale, of 67.5° Brix, in which the sugar solids content was about 8.06% dextrose and 91.94% sucrose, was introduced continuously into a high speed centrifugal film evaporator of the turba-film type (Rodney Hunt) described hereinabove, in which the temperature control was set at 287° F. to maintain continuously the temperature of the condensed sugar solution as it leaves the evaporator at between 285 and 289° F. at all times. The continuous flow of the sugar solution through the centrifugal evaporator was maintained at a rate of 6 pounds of sugar solids per minute. At the time of continuously discharging from the centrifugal evaporator, most of the water had been removed from the sugar solution and it had a Brix of 95–97°. The concentrated sugar solution discharged from the centrifugal evaporator was next passed continuously into a mixer-crystallizer maintained at a temperature so that the solid sugar product which was discharged from it had a temperature of between about 215–230° F. and was dry, free from lumps and soft grained. The substantially dry sugar product was then passed continuously through a mixer having a cooling jacket through which was passed cold circulating water. Refrigerated air, at a temperature of about 33–40° F., under a pressure of about 60 p.s.i., was passed over the crystals while they were being mixed. When the dry sugar product was discharged from the mixer it had a temperature of less than 100° F. The resulting product yielded the following analytical data:

Sucrose _____ 90.27%.
Dextrose [1] _____ 9.13%.
Moisture _____ 0.6% max.
Color (Horne scale) _____ 0.9 max.
Average density _____ 36.5 pounds per cubic foot.

[1] This figure represents dextrose plus reducing sugars produced in process.

Photomicrographs of this sugar showed it to be made up of small crystals about the same size as those of the products of Examples 1 and 2, which were irregular and sharp-edged and mostly occur as clusters but also occur singly and in groups. The sugar had a higher rate of solution than granulated sugar or the product of Example 1, but it was not quite as rapid in dissolving as the product of Example 2. It occupied a greater volume per unit weight than granulated sugar or the product of Example 1, but is about the same in this respect as the product of Example 2.

Icings made from this sugar are as smooth as those made from powdered granulated sugar or the product of Example 1, but not as smooth as those made from the product of Example 2. Powdering this product enhances the icing properties.

EXAMPLE 4

This example describes the preparation of a dry crystalline sugar product in accordance with the invention containing about 91% sucrose and 9% corn syrup solids.

An aqueous sugar solution, having a color of 0.2 on the Horne scale, of 68.6° Brix, in which the sugar solids content was as follows: 8.09% corn syrup solids and 91.4% sucrose, was continuously introduced into a high speed centrifugal film evaporator of the turba-film type (Rodney Hunt), described hereinabove, in which the temperature control was set at 287° F. to maintain continuously the temperature of the sugar solution between 285 and 289° F. The continuous flow of the sugar solution through the centrifugal evaporator was maintained at a rate of 6 pounds of sugar solids per minute. At the time of continuously discharging from the centrifugal evaporator, most of the water had been removed from the sugar solution and it had a Brix of 95–97°. The concentrated sugar solution discharged from the centrifugal evaporator was next passed continuously into a mixer-crystallizer maintained at a temperature so that the solid sugar product which was discharged from it had a temperature of between about 215 and 230° F. and was dry, free from lumps and soft grained. The substantially dry sugar product was then passed continuously through a cooling mixer having a cooling jacket through which was passed cold circulating water. Refrigerated air, at a temperature of about 33–40° F., under a pressure of about 60 p.s.i., was passed over the crystals while they were being mixed. When the dry sugar product was discharged from the cooling mixer it had a temperature of less than 100°

F. The resulting product yielded the following analytical data:

Sucrose _____ 90.5%.
Corn syrup solids
  and reducing sugars
  formed in process _____ 8.9%.
Moisture _____ 0.6% max.
Color (Horne scale) _____ 0.4 max.
Density _____ 36.5 pounds per cubic foot.

This sugar in the powdered form makes a better icing than powdered granulated sugar, or the product of Example 1, powdered and unpowdered, and as good an icing as powdered products produced by Examples 2 and 3.

Dry sugar products in accordance with this example were made using 3% and 5% corn syrup solids of total sugar solids.

The critical temperature ranges for these sugars are:

| Sugars | Critical Temperature Range, °F. |
|---|---|
| 3% Corn Syrup Solids, 97% Sucrose | 270–274 |
| 5% Corn Syrup Solids, 95% Sucrose | 276–280 |

EXAMPLE 5

This example describes the preparation of a dry crystalline sugar product in accordance with the invention containing about 92% sucrose and 7% lactose.

An aqueous sugar solution, having a color of 0.3 on the Horne scale, of 66.7° Brix, in which the sugar solids content was about 6.7% lactose and 93.3% sucrose, was introduced into a high speed centrifugal film evaporator of the turba-film type (Rodney Hunt), described hereinabove, in which the temperature control was set at 267° F. to maintain continuously the temperature of condensed sugar solution leaving the evaporator at between 265 and 269° F. at all times. The continuous flow of the sugar solution through the centrifugal evaporator was maintained at a rate of 6 pounds of sugar solids per minute. At the time of continuously discharging from the centrifugal evaporator, most of the water had been removed from the sugar solution and it had a Brix of 92–94°. The concentrated sugar solution discharged from the centrifugal evaporator was next passed continuously into a mixer-crystallizer maintained at a temperature so that the solid sugar product which was discharged from it had a temperature of between about 180 and 220° F. and was dry, free from lumps and soft grained. The substantially dry sugar product was then passed continuously through a cooling mixer having a cooling jacket through which was passed cold circulating water. Refrigerated air, at a temperature of about 30–40° F., under a pressure of about 60 p.s.i., was passed over the crystals while they were being mixed. When the dry sugar product was discharged from the cooling mixer it had a temperature of less than 100° F. The resulting product yielded the following analytical data:

Sucrose _____ 92.4%.
Lactose [1] _____ 7.0%.
Moisture _____ 0.6% max.
Color (Horne scale) _____ 0.5 max.
Density _____ 46 pounds per cubic foot.

[1] This figure represents lactose plus the reducing sugars produced in process.

This sugar was excellent for use in products in which hygroscopicity is a problem. It maintained products dry and free flowing, even at low temperatures and at high humidities.

Similar products in accordance with this example were made using 3% and 5% lactose solids of total sugar solids. In these sugar products containing 3, 5 and 7% lactose, the critical temperature range is the same for all. However, as the lactose concentration is increased, the protection against the effects of hygroscopicity is increased.

EXAMPLE 6

This example describes the preparation of a dry crystalline sugar product in accordance with the invention containing about 90% sucrose and roughly 5% each of lactose and invert sugar.

An aqueous sugar solution, having a color of 0.3 on the Horne scale, of 67.7° Brix, in which the sugar solids content was about 5% invert, 5% lactose and 90% sucrose, was introduced into a high speed centrifugal film evaporator of the turba-film type (Rodney Hunt), described hereinabove, in which the temperature control was set at 287° F. to maintain continuously the temperature of concentrated sugar solution leaving the evaporator at between 285 and 289° F. at all times. The continuous flow of the sugar solution through the centrifugal evaporator was maintained at a rate of 6 pounds of sugar solids per minute. At the time of continuous discharging from the centrifugal evaporator, most of the water had been removed from the sugar solution and it had a Brix of 95–97°. The concentrated sugar solution discharged from the centrifugal evaporator was next passed continuously into a mixer-crystallizer maintained at a temperature so that the solid sugar product which was discharged from it had a temperature of between about 215 and 230° F. and was dry, free from lumps and soft grained. The substantially dry sugar product was then passed continuously through a cooling mixer having a cooling jacket through which was passed cold circulating water. Refrigerated air, at a temperature of about 33–40° F., under a pressure of about 60 p.s.i., was passed over the crystals while they were being mixed. When the dry sugar product was discharged from the cooling mixer it had a tempearture of less than 100° F. The resulting product yielded the following analytical data:

Reducing sugars, invert and
  lactose [1] _____ 10.16%.
Sucrose _____ 89.24%.
Moisture _____ 0.6% max.
Color (Horne scale) _____ 0.9 max.
Density _____ 40.5 pounds per cubic foot.

[1] Lactose and invert expressed as reducing sugars.

Sugar products in accordance with the above example were made containing 2% invert, 2% lactose, 96% sucrose; and 8% invert, 2% lactose, 90% sucrose.

The critical temperatures required for these sugars were:

| Sugar | Critical Temperature, °F. |
|---|---|
| 2% Invert, 2% Lactose, 96% Sucrose | 275–279 |
| 8% Invert, 2% Lactose, 90% Sucrose | 285–289 |

EXAMPLE 7

This example describes the preparation of a dry crystalline sugar product in accordance with the invention from amber sucrose solutions containing considerable ash, color, invert and organic non-sugars and containing about 98% sucrose and 1.23% invert sugar.

An aqueous sugar solution, having a color of 5.2 on the Horne scale, of 67.5° Brix, in which the sugar solids content was about 1.23% invert and 98% sucrose, and containing 0.26% ash, was introduced into a high speed centrifugal film evaporator of the turba-film type (Rodney Hunt), described hereinabove, in which the temperature control was set at 267° F. to maintain continuously the temperature of the sugar solution between 265 and 269° F. at all times. The continuous flow of the sugar solution through the centrifugal evaporator was maintained at a rate of 6 pounds of sugar solids per minute. At the time of continuously discharging from the centrifugal evaporator, most of the water had been removed from the sugar solution and it had a Brix of 92–94°. The concentrated sugar solution discharged from the centrifugal evaporator was next passed continuously into a mixer-crystallizer maintained at a temperature so that the solid sugar product which was discharged from it had a temperature of between about 180 and 220° F. and was dry, free from lumps and soft grained. The substantially dry sugar product was then passed continuously through a cooling mixer having a cooling jacket through which was passed cold circulating water. Refrigerated air, at a temperature of about 33–40° F., under a pressure of about 60 p.s.i., was passed over the crystals while they were being mixed. When the dry sugar product was discharged from the cooling mixer it had a temperature of less than 100° F. The resulting product yielded the following analytical data:

Invert _____ 1.6%.
Sucrose _____ 97.54%.
Moisture _____ 0.6% max.
Ash _____ 0.26%.
Color (Horne scale) _____ 8.6.
Density _____ 43.5 pounds per cubic foot.

This sugar has excellent use in chocolate manufacture because it produces a smooth, good tasting chocolate. This is due to the ease in crushing the sugar. It also has much use in baked products.

To demonstrate the high bulkiness or low density of the dry sugar products of the invention, the density of a number of the products produced in accordance with the seven examples hereinabove has been compared with that of extra fine granulated sucrose. The results are listed in Table 2, below:

*Table 2*

| Sugar Product | Density, Pounds Per Cubic Foot |
|---|---|
| Extra-fine granulated sucrose | 53 |
| Principally sucrose (Example 1) | 46.0 |
| Sucrose-invert (8%) (Example 2) | 36.5 |
| Sucrose-dextrose (9%) (Example 3) | 36.5 |
| Sucrose-corn syrup (9%) (Example 4) | 36.5 |
| Sucrose-lactose (7%) (Example 5) | 46.0 |
| Sucrose-invert (5%) lactose (5%) (Example 6) | 40.5 |
| Amber sucrose (Example 7) | 43.5 |

These data show that the sugar products of the invention have less density and therefore have greater bulk (occupy a larger volume per unit weight) than extra-fine granulated sucrose.

To demonstrate the rapid rate of dissolving in water, the dissolving rate of a number of products in accordance with the seven examples hereinabove has been compared with that of extra-fine granulated sucrose. The rate of dissolving was measured at a constant rate of agitation at 20° C. for each sugar product. The rate is based on the number of grams of sugar product dissolved in 1000 grams of water solution in one second. The results are listed in Table 3, below:

*Table 3*

| Sugar Product | Grams dissolved in 1,000 grams of water solution in one second |
|---|---|
| Extra-fine granulated sucrose | 78.2 |
| Principally sucrose (Example 1) | 85.0 |
| Sucrose-dextrose (9%) (Example 3) | 89.4 |
| Sucrose-corn syrup (9%) (Example 4) | 92.0 |
| Sucrose-invert (8%) (Example 2) | 94.0 |

These data show that the sugar products of the invention dissolve more rapidly than the extra-fine granulated sucrose.

EXAMPLE 8

This example describes the preparation of a dry crystalline starch-containing sugar product in accordance with the invention containing only insignificant amounts of ash, color, and sugars other than sucrose and about 1% by weight of gelatinized starch. This product is suitable for ordinary industrial use in production of icings.

55 gallons of a water white liquid aqueous solution containing 412 lbs. of sucrose were mixed with a slurry of about 4.17 lbs. of corn starch (Buffalo brand produced by Corn Products Company) in 4.17 lbs. of water. The resulting solution thoroughly blended with the starch slurry was introduced continuously into a high speed centrifugal film evaporator of the turba-film type (Rodney Hunt), described hereinabove, in which the temperature control was set at 267° F. to maintain continuously the temperature of the sugar mixture continuously leaving the evaporator at between 265 and 269° F. at all times. The continuous flow of the sugar mixture through the centrifugal evaporator was maintained continuously at a rate of from 6 to 12 pounds of sugar solids per minute. At the time of discharging the mixture from the centrifugal evaporator, most of the water had been removed from the sugar solution and it had a Brix of 92–94°. The concentrated starch-containing sugar mixture discharged from the centrifugal evaporator was next continuously passed into a mixer-crystallizer maintained at a temperature so that the crystalline sugar product which was discharged from it had a temperature of between about 180 and 190° F. and was dry, free from lumps and soft grained. The substantially dry crystalline starch-containing sugar product was then passed continuously through a mixer having a cooling jacket through which was passed cold circulating water. Refrigerated air at a temperature of about 33–40° F., under a pressure of about 60 p.s.i., was passed over the crystals while they were being mixed. When the dry crystalline starch-containing sugar product was discharged from the mixer, it had a temperature of less than 100° F. The resulting product yielded the following analytical data:

Sucrose _____percent__ 98.0
Invert _____do____ 0.4
Starch _____do____ 1.0
Moisture _____do____ 0.6
Density _____pound per cubic foot__ 46

Photomicrographs show this dry crystalline product to be made up of irregular, sharp-edged crystals, which occur in clusters, singly and in groups. The crystals were smaller than granulated sugar crystals. The crystals were fragile and could easily be crushed with pressure. These crystals occupied a greater volume per unit weight than regular granulated sugar; they had a higher rate of taking up water than commercially available icing sugars.

EXAMPLE 9

This example describes the preparation of a dry crystalline starch-containing sugar product in accordance with the invention containing about 90% sucrose, 8% corn syrup solids and 2% starch. It provides an excellent dry sugar product for producing fondant creams and fondant cake icings.

An aqueous sugar mixture, in which the solids content was as follows: 8% corn syrup solids, 90% sucrose and 2% starch, was prepared by blending the following:

55 gallons of aqueous solution containing 412 lbs. of sucrose.

3.86 gallons of aqueous solution containing 36.6 lbs. of corn syrup solids.

9.2 lbs. of corn starch (Buffalo brand) suspended in 9.2 lbs. of water.

The resulting mixture was continuously introduced into a high speed centrifugal film evaporator of the turbafilm type (Rodney Hunt), described hereinabove, in which the temperature control was set at 287° F. to maintain continuously the temperature of the mixture between 285 and 289° F. The continuous flow of the starch-containing sugar mixture through the centrifugal evaporator was maintained at a rate of 6 pounds of solids per minute. At the time of continuously discharging from the centrifugal evaporator, most of the water had been removed from the mixture and it had a Brix of 95–97°. The concentrated starch-containing sugar mixture discharged from the centrifugal evaporator was next passed continuously into a mixer-crystallizer maintained at a temperature so that the solid starch-containing sugar product which was discharged from it had a temperature of between about 215 and 230° F. and was dry, free from lumps and soft grained. The substantially dry product was then passed continuously through a cooling mixer having a cooling jacket through which was passed cold circulating water. Refrigerated air, at a temperature of about 33–40° F., under a pressure of about 60 p.s.i., was passed over the crystals while they were being mixed. When the dry starch-containing sugar product was discharged from the cooling mixer it had a temperature of less than 100° F. The product was then powdered. The resulting product yielded the following analytical data:

| | |
|---|---|
| Sucrose _____ percent__ | 87.5 |
| Corn syrup solids plus invert formed in process _____ do____ | 9.9 |
| Starch _____ do____ | 2.0 |
| Moisture _____ do____ | 0.6 |
| Density _____ pounds per cubic foot__ | 36 |

This powdered, dry starch-containing crystalline sugar product provides a better fondant cake icing than powdered granulated sugar with or without added starch.

EXAMPLE 10

This example describes the preparation of a fondant cream or fondant cake icing employing a powdered dry starch-containing crystalline sugar product of the invention, namely, the crystalline product of Example 9.

100 lbs. of the dry crystalline sugar product of Example 9 (containing 2% corn starch, 8% corn syrup solids and 90% sucrose) and 15 lbs. of water were thoroughly mixed. The resulting fondant was homogeneous, had a smooth creamy consistency and the liquid and solid phases showed no tendency to separate even on prolonged standing.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A process for producing crystalline sugar products which comprises rapidly evaporating at a temperature of between about 260 and 300° F. an aqueous sugar solution having a Brix of above about 50° until the Brix value is increased rapidly to at least about 90°, mixing the resulting supersaturated aqueous solution while the product crystallizes and while the moisture is simultaneously liberated so that the product contains less than about 1% moisture and continuing the mixing of the resulting crystalline product, while cooling it, until its temperature is reduced to below about 100° F.

2. A process for producing crystalline sugar products which comprises rapidly evaporating at a temperature of between about 260 and 300° F. an aqueous sugar solution having a Brix of between about 50° and 75°, until the Brix value is increased rapidly to between about 90° and 97°, mixing the resulting supersaturated aqueous solution while reducing the temperature to between about 180 and 230° F. and while the product crystallizes and while the moisture is simultaneously liberated so that the product contains less than about 1% moisture, and continuing the mixing of the resulting crystalline product, while cooling it, until its temperature is reduced to below about 100° F.

3. A process for producing crystalline sugar products which comprises rapidly evaporating at a temperature of between about 260 and 300° F. an aqueous sugar solution of sucrose containing at least one other saccharide comprising not more than 10% by weight of the sugar solids, having a Brix of between about 50° and 75°, until the Brix value is increased rapidly to between about 90° and 97°, mixing the resulting supersaturated aqueous solution while reducing the temperature to between about 180 and 230° F. and while the product crystallizes and while the moisture is simultaneously liberated so that the product contains less than about 1% moisture, and continuing the mixing of the resulting crystalline product, while cooling it, until its temperature is reduced to below about 100° F.

4. A process as defined in claim 3 wherein the other saccharide is starch and is present in an amount of between about 1% and 10%, by weight of sucrose solids.

5. A process as defined by claim 3 wherein, in addition to sucrose there is present between about 1% and 10% by weight of starch, based upon sucrose solids, and up to about 10% of a reducing sugar.

6. A process as defined by claim 3 wherein the initial sugar solution contains up to about 25% of the total sugar solids in the form of invert sugar and the temperature of evaporation is equal to 267° F.+2.5a, wherein "a" is equal to the percent of invert in the total sugar solids.

7. A process for producing crystalline sugar products which comprises rapidly evaporating at a temperature between about 260 and 300° F. an aqueous sugar solution of sucrose containing at least one other saccharide comprising not more than 10% by weight of the sugar solids, having a Brix between about 50° and 75°, until the Brix value is increased rapidly to between about 90° and 97°, mixing the resulting supersaturated aqueous solution while reducing the temperature to between about 180 and 230° F. and while the product crystallizes and while the moisture is simultaneously liberated so that the product contains less than about 1% moisture, and continuing the mixing of the resulting crystalline product, while cooling it, until its temperature is reduced to below about 100° F.

8. A dry crystalline sugar product containing less than about 1% moisture, comprising fragile, fine-grain aggregates of rough, jagged, porous crystals, said product having a density of not more than 46 pounds per cubic foot, being substantially non-hygroscopic, non-caking and capable of dissolving in water more rapidly than granulated sucrose, and also comprising up to about 10% by weight of cooked starch and the remainder substantially sucrose; said starch being uniformly distributed throughout each of said crystals in the same proportion as hereinabove set forth.

9. A dry crystalline sugar product containing less than about 1% moisture, comprising fragile, fine-grain aggregates of rough, jagged, porous crystals, said product having a density of not more than 46 pounds per cubic foot, being substantially non-hygroscopic, non-caking and capable of dissolving in water more rapidly than granulated sucrose, and also comprising up to about 10% of at least one additional sugar and up to about 10% by weight of cooked starch and the remainder substantially sucrose; said starch being uniformly distributed throughout each of said crystals in the same proportion as hereinabove set forth.

10. A dry crystalline sugar product containing less than about 1% moisture, comprising fragile, fine-grain aggregates of rough jagged, porous crystals, said product having a density of not more than 46 pounds per cubic foot, being substantially non-hygroscopic, non-caking and capable of dissolving in water more rapidly than granulated sucrose, said product consisting essentially of about 90% of sucrose, 8% of corn syrup solids, and 2% of cooked starch uniformly distributed throughout each of said crystals in the same proportion as hereinabove set forth.

References Cited in the file of this patent

UNITED STATES PATENTS

| | | |
|---|---|---|
| 1,309,425 | Shaw | July 8, 1919 |
| 1,454,153 | Carr et al. | May 8, 1923 |
| 1,740,693 | Hershey | Dec. 24 1929 |
| 1,826,701 | Ames | Oct. 13, 1931 |
| 2,199,887 | Lund | May 7 1940 |
| 2,299,287 | Whymper | Oct. 20, 1942 |
| 2,373,919 | Schweiger | Apr. 17 1945 |
| 2,558,775 | Northcutt et al. | July 3, 1951 |
| 2,818,356 | Shookhoff | Dec. 31 1957 |